US009678247B2

(12) United States Patent
Bookbinder et al.

(10) Patent No.: US 9,678,247 B2
(45) Date of Patent: *Jun. 13, 2017

(54) PRIMARY OPTICAL FIBER COATING COMPOSITION CONTAINING NON-RADIATION CURABLE COMPONENT

(71) Applicant: Corning Incorporated, Corning, NY (US)

(72) Inventors: Dana Craig Bookbinder, Corning, NY (US); Michael Edward DeRosa, Painted Post, NY (US); Kevin Robert McCarthy, Horseheads, NY (US); Weijun Niu, Painted Post, NY (US); David Neal Schissel, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 663 days.

This patent is subject to a terminal disclaimer.

(21) Appl. No.: 13/833,350

(22) Filed: Mar. 15, 2013

(65) Prior Publication Data

US 2013/0302003 A1  Nov. 14, 2013

Related U.S. Application Data

(60) Provisional application No. 61/644,061, filed on May 8, 2012.

(51) Int. Cl.
*G02B 1/10* (2015.01)
*C09D 4/00* (2006.01)
(Continued)

(52) U.S. Cl.
CPC ............. *G02B 1/105* (2013.01); *C08G 18/10* (2013.01); *C08G 18/755* (2013.01);
(Continued)

(58) Field of Classification Search
None
See application file for complete search history.

(56) References Cited

U.S. PATENT DOCUMENTS

| 4,076,380 A | 2/1978 | DiMarcello et al. |
| 4,176,911 A | 12/1979 | Marcatili et al. |

(Continued)

FOREIGN PATENT DOCUMENTS

| CN | 101906235 | 12/2010 |
| CN | 102186933 | 9/2011 |

(Continued)

OTHER PUBLICATIONS

PCT International Search Report Jul. 11, 2013.
(Continued)

*Primary Examiner* — Jeffrey Washville
(74) *Attorney, Agent, or Firm* — Kevin L. Bray

(57) ABSTRACT

A radiation curable composition is disclosed that includes a curable cross-linker essentially free of urethane and urea functional groups, a curable diluent, and a non-radiation curable component comprising (thio)urethane and/or urea groups. Coated optical fibers having a primary coating formed from this radiation curable composition, as well as optical fiber ribbons that contain the coated optical fibers are disclosed. Methods of making the optical fibers and ribbons are also disclosed.

31 Claims, 4 Drawing Sheets

(51) Int. Cl.
- *C08G 18/75* (2006.01)
- *C08G 18/10* (2006.01)
- *C09D 175/04* (2006.01)
- *G02B 6/44* (2006.01)
- *G02B 6/02* (2006.01)

(52) U.S. Cl.
CPC ............ *C08G 18/758* (2013.01); *C09D 4/00* (2013.01); *C09D 175/04* (2013.01); *G02B 6/02395* (2013.01); *G02B 6/4403* (2013.01)

(56) References Cited

U.S. PATENT DOCUMENTS

| | | | |
|---|---|---|---|
| 4,391,686 A * | 7/1983 | Miller | C08F 2/50 522/120 |
| 4,439,008 A | 3/1984 | Joormann et al. | |
| 4,474,830 A | 10/1984 | Taylor | |
| 4,581,165 A | 4/1986 | Frank et al. | |
| 4,752,112 A | 6/1988 | Mayr | |
| 4,921,880 A | 5/1990 | Lee et al. | |
| 4,962,992 A | 10/1990 | Chapin et al. | |
| 5,104,433 A | 4/1992 | Chapin et al. | |
| 5,188,864 A | 2/1993 | Lee et al. | |
| 5,242,963 A | 9/1993 | Mao | |
| 5,486,378 A | 1/1996 | Oestreich et al. | |
| 5,729,645 A | 3/1998 | Garito et al. | |
| 5,997,682 A * | 12/1999 | Goodman | B29C 35/08 156/273.7 |
| 2003/0060588 A1 * | 3/2003 | Jacobine | C08G 18/4875 528/44 |
| 2007/0088145 A1 | 4/2007 | Mgaya et al. | |
| 2007/0100039 A1 * | 5/2007 | Hancock, Jr. | C08F 283/00 524/186 |
| 2011/0300367 A1 | 12/2011 | Chien | |
| 2012/0321270 A1 * | 12/2012 | Imai | C03C 25/106 385/141 |

FOREIGN PATENT DOCUMENTS

| | | |
|---|---|---|
| EP | 0522405 A1 | 1/1993 |
| EP | 1172391 A1 | 1/2002 |
| EP | 1743911 A1 | 1/2007 |
| WO | 2007050308 A1 | 5/2007 |
| WO | 2011081519 A1 | 7/2011 |

OTHER PUBLICATIONS

Malucelli, et al, "Synthesis of Poly(propylene-glycol-diacrylates) and Properties of the Photocured Networks," J. Appl. Polymer Sci. 65(3): 491-497 (1997).

PCT International Search Report Sep. 11, 2013.

* cited by examiner

PRIMARY OPTICAL FIBER COATING COMPOSITION CONTAINING NON-RADIATION CURABLE COMPONENT

CROSS-REFERENCE TO RELATED APPLICATIONS

This application claims the benefit of priority under 35 U.S.C. §119 of U.S. Provisional Application Ser. No. 61/644,061, filed on May 8, 2012, the content of which is relied upon and incorporated herein by reference in its entirety.

FIELD OF THE INVENTION

The present invention relates to a primary optical fiber coating composition and novel components thereof, radiation cured coatings formed from composition, coated optical fibers encapsulated by the cured coating, and methods of making the same.

BACKGROUND OF THE INVENTION

The light transmitting performance of an optical fiber is highly dependent upon the properties of the polymer coating that is applied to the fiber during manufacturing. Typically a dual-layer coating system is used where a soft inner-primary coating is in contact with the glass fiber and a harder, outer-primary or secondary coating surrounds the inner-primary coating. The hard coating allows the fiber to be handled and further processed, while the soft coating plays a key role in dissipating external forces and preventing them from being transferred to the fiber where they can cause microbend induced light attenuation.

The functional requirements of the inner-primary coating place various requirements on the materials that are used for these coatings. The Young's modulus of the inner-primary coating is generally less than 1 MPa, and is ideally less than 0.5 MPa. The glass transition temperature of the inner-primary coating is less than 5° C., and is ideally about −20° C. or less to ensure that the coating remains soft when the fiber is subjected to low temperatures. In order to ensure uniform deposition on the fiber, the coating is applied to the fiber in liquid form and must quickly form a solid having sufficient integrity to support application of the outer-primary coating. Also, the tensile strength of the coating, which generally decreases as the modulus decreases, must be high enough to prevent tearing defects during draw processing or subsequent processing of the coated fiber during cabling, etc.

To meet these requirements, optical fiber coatings have traditionally been formulated as mixtures of radiation curable urethane/acrylate oligomers and radiation curable acrylate functional diluents. Upon exposure to light and in the presence of a photoinitiator, the acrylate groups rapidly polymerize to form a crosslinked polymer network which is further strengthened by the hydrogen bonding interactions between urethane groups along the oligomer backbone. By varying the urethane/acrylate oligomer, it is possible to form coatings having very low modulus values while still having sufficient tensile strength. Numerous optical fiber coating formulations have already been disclosed in which the composition of the radiation curable urethane/acrylate oligomer has been varied to achieve different property targets.

Despite the ability to generate coatings that adequately protect the underlying optical fiber and produce low signal loss (attenuation), there continues to be a need to further improve the properties of optical fibers and their coatings. The present invention is directed to overcoming these and other deficiencies in the art.

SUMMARY OF THE INVENTION

A first aspect of the invention relates to a radiation curable composition that includes a curable cross-linker essentially free of urethane and urea functional groups; a curable diluent; and a non-radiation curable component comprising (thio)urethane and/or urea groups.

A second aspect of the present invention relates to a coated optical fiber that includes an optical fiber and a primary coating that surrounds the optical fiber, wherein the primary coating is the cured product of the composition according to the first aspect of the present invention.

A third aspect of the present invention relates to an optical fiber ribbon or bundle that includes a plurality of substantially aligned optical fibers according to the second aspect of the present invention and a matrix encapsulating the plurality of optical fibers.

A fourth aspect of the present invention relates to a method of manufacturing an optical fiber according to the second aspect of the present invention. The method includes applying a composition according to the first aspect of the present invention to an optical fiber, and exposing the composition to radiation that is effective to cure the composition and thereby form a primary coating that surrounds the optical fiber.

A fifth aspect of the present invention relates to a non-radiation curable component comprising (thio)urethane and/or urea groups that is useful in preparing the coating composition according to the first aspect of the present invention.

According to one embodiment, the non-radiation curable component comprises a core moiety covalently linked to two or more block moieties that comprise the (thio)urethane and/or urea groups, and terminate in a non-radiation curable capping agent. Each of the block moieties contains one or more soft blocks and optionally one or more hard blocks, wherein the average weight ratio of the soft blocks to hard blocks is at least 3:1. The soft blocks are the reaction products of a di(thio)isocyanate and a polyol or amine-capped polyol, whereas the hard blocks are the reaction products of a di(thio)isocyanate and a diol or diamine comprising a hydrocarbon or oxygen-containing hydrocarbon having an average molecular weight of between about 28 to about 400.

The accompanying Examples demonstrate the preparation and use of low modulus primary fiber coatings in which low strength polymer networks are prepared based on polyol diacrylates modified by non-reactive branched urethane components, or NRBUs. The non-reactive urethane-containing "arms" or branches of the components are of high molecular weight and are designed to become entangled within the acrylic network as it is formed, creating physical interactions (but not covalent bonds) with the cross-linked network to enhance the otherwise poor tensile strength of the acrylic network. The results demonstrate the generation of several coating compositions having a Young's modulus of less than about 1.0 MPa, a tensile strength of at least about 0.4 MPa, more preferably at least about 0.5 MPa, an elongation at break of at least about 70%, and a $T_g$ that is less than −10° C. With these properties, it is believed that optical fibers possessing these primary coatings will exhibit improved (i.e., lower) attenuation losses.

DETAILED DESCRIPTION OF THE INVENTION

The present invention relates to optical fiber primary coating compositions, coated optical fibers encapsulated by the primary coating, and methods of making the same.

Figure 1:
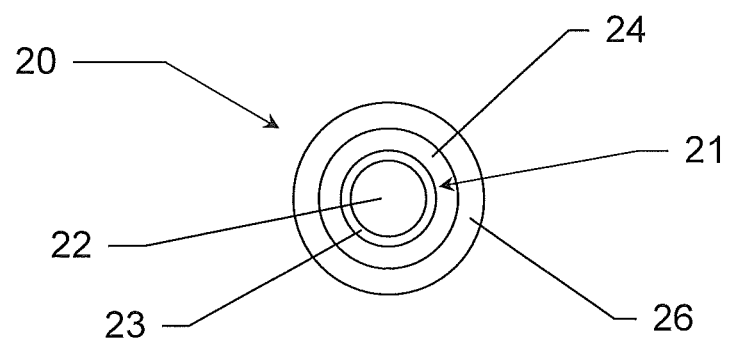
FIG. 1 is a schematic view of a coated optical fiber according one embodiment of the present invention.

One embodiment of the present invention relates to a coated optical fiber. An example of a coated optical fiber is shown in schematic cross-sectional view in FIG. 1. Coated optical fiber 20 includes a glass optical fiber 21 surrounded by primary coating 24 and secondary coating 26. The primary coating 24 is the cured product of a coating composition of the invention.

The glass fiber 21 is an uncoated optical fiber including a core 22 and a cladding 23, as is familiar to the skilled artisan. In many applications, the core and cladding layer have a discernable core-cladding boundary. Alternatively, the core and cladding layer can lack a distinct boundary. One such fiber is a step-index fiber. Exemplary step-index fibers are described in U.S. Pat. Nos. 4,300,930 and 4,402,570 to Chang, each of which is hereby incorporated by reference in its entirety. Another such fiber is a graded-index fiber, which has a core whose refractive index varies with distance from the fiber center. A graded-index fiber is formed basically by diffusing the glass core and cladding layer into one another. Exemplary graded-index fibers are described in U.S. Pat. No. 5,729,645 to Garito et al., U.S. Pat. No. 4,439,008 to Joormann et al., U.S. Pat. No. 4,176,911 to Marcatili et al., and U.S. Pat. No. 4,076,380 to DiMarcello et al., each of which is hereby incorporated by reference in its entirety.

The optical fiber may also be single or multi-moded at the wavelength of interest, e.g., 1310 or 1550 nm. The optical fiber may be adapted for use as a data transmission fiber (e.g. SMF-28®, LEAF®, and METROCOR®, each of which is available from Corning Incorporated of Corning, N.Y.). Alternatively, the optical fiber may perform an amplification, dispersion compensation, or polarization maintenance function. The skilled artisan will appreciate that the coatings described herein are suitable for use with virtually any optical fiber for which protection from the environment is desired.

In coated optical fiber 20, glass fiber 21 is surrounded by a primary coating 24. Primary coating 24 is formed from a soft, partially crosslinked polymer material having a Young's modulus of less than about 2 MPa, a low glass transition temperature ($T_g$), and tensile strength of greater than about 0.2 MPa.

As used herein, the Young's modulus, elongation to break, and tensile strength of a cured polymeric material are measured using a 5 mil film cut to a specified length and width (15 cm×1.3 cm) and installed on a tensile testing instrument (e.g. a Sinitech MTS Tensile Tester, or an Instron Universal Material Test System) according to the procedures set forth in ASTM Standard D882-97. In certain embodiments, the cured primary coating has a Young's modulus of less than about 2 MPa, preferably less than about 1.25 MPa, more preferably less than about 1.0 MPa. Lower Young's modulus values are most preferred, for example, less than about 0.9 MPa, 0.8 MPa, or 0.7 MPa. Preferably, the cured primary coating has a tensile strength of at least about 0.2 MPa, more preferably at least about 0.3, 0.4, or 0.5 MPa, even more preferably at least about 0.6 MPa, 0.7 MPa, or 0.8 MPa. In certain embodiments, the tensile strength of the cured primary coating is at least about 50% of the Young's modulus of the coating, more preferably at least about 75% of the Young's modulus of the coating. The cured primary coating has an elongation at break of at least about 70%, more preferably at least about 80%, even more preferably at least about 90%, and most preferably at least about 100%.

The glass transition temperatures of the cured films were determined from the maximum peak of the tan delta curves measured on a Seiko-5600 DMS in tension at a frequency of 1 Hz. Tan delta is defined as the loss modulus (E") divided by storage modulus (E'). In certain embodiments, the cured primary coating has a $T_g$ of less than about 5° C., more preferably about 0° C., even more preferably about −10° C. or about −20° C.

In certain embodiments, the cured primary coating of the present invention is characterized by a broadening of its tan delta vs. temperature curve relative to primary coatings lacking a non-radiation curable component comprising (thio)urethane and/or urea groups. In particular, the broadening of the tan delta curve is evident as a shallower slope of the curve at temperatures above the $T_g$. This means that the cured primary coatings of the present invention will exhibit, relative to an otherwise identical control coating lacking a non-radiation curable component comprising (thio) urethane and/or urea groups, an enhanced ability to dissipate or absorb mechanical stress at temperatures above the $T_g$. In certain embodiments, the tan delta value exceeds 0.9 over a temperature range that is greater than 12° C., more preferably greater than 13° C., even more preferably greater than 14° C. In certain embodiments, the tan delta value exceeds 0.8 over a temperature range that is greater than 15° C., more preferably greater than 20 or 25° C., even more preferably greater than 30 or 35° C. In certain embodiments, the tan delta value exceeds 0.7 over a temperature range that is greater than 18 or 20° C., more preferably greater than 25 or 30° C., even more preferably greater than 35 or 40° C. In certain embodiments, the tan delta value exceeds 0.6 over a temperature range that is greater than 22 or 25° C., more preferably greater than 30 or 35° C., even more preferably greater than 40 or 45° C.

The primary coating 24 desirably has a higher refractive index than the cladding of the optical fiber in order to allow it to strip errant optical signals away from the optical fiber core. The primary coating should maintain adequate adhesion to the glass fiber during thermal and hydrolytic aging, yet be strippable therefrom for splicing purposes. The primary coating typically has a thickness in the range of 25-40 μm (e.g. about 32.5 μm). Primary coatings are typically applied to the glass fiber as a liquid and cured, as will be described in more detail herein below.

The primary coatings of the present invention are the cured product of a curable cross-linker that is essentially free of (thio) urethane and urea functional groups, a curable diluent, and a non-radiation curable component comprising (thio) urethane and/or urea groups.

As used herein, the term "curable" is intended to mean that the component includes one or more functional groups capable of forming covalent bonds that participate in linking the components to form the polymeric coating material (i.e., the cured product). Cross-linking of the cross-linker or diluent occurs when the curable cross-linker or diluent includes two or more functional groups, each of which is capable of forming covalent bonds that participate in linking the components to form the polymeric coating material. Examples of these functional groups that participate in covalent bond formation are identified hereinafter. In contrast, as used herein, the terms "non-curable" and "non-radiation curable" are intended to mean that the component is lacking in functional groups capable of forming covalent bonds during the initial curing process.

Figure 3:
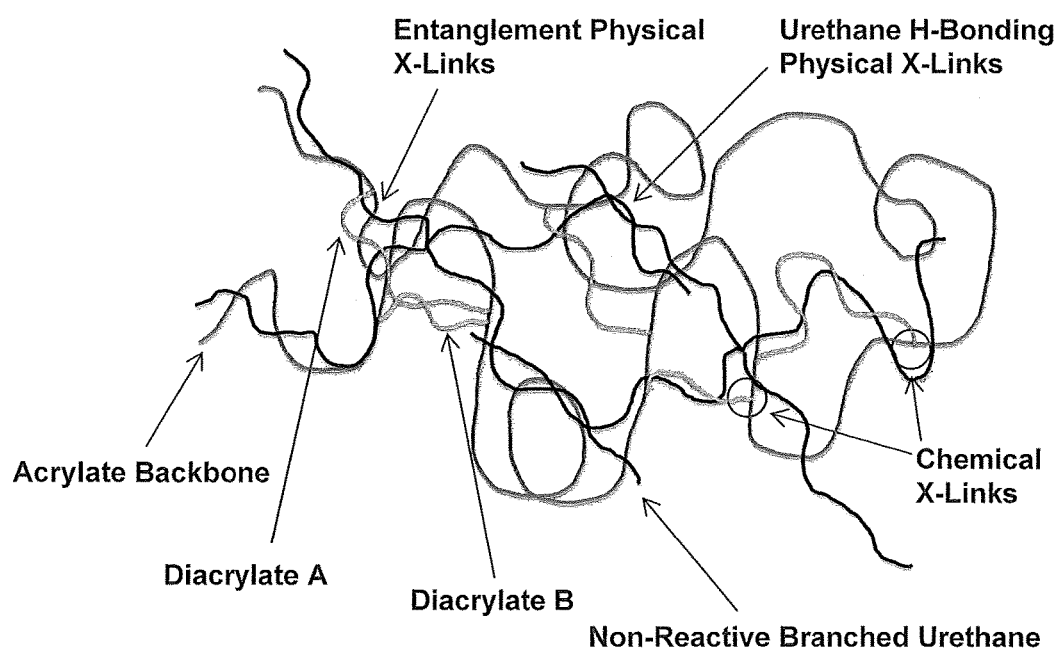
FIG. 3 is a schematic illustration of a primary coating of the invention, which is a lightly covalently crosslinked acrylate coating reinforced by the physical mechanisms (e.g., H-bonding) provided by non-reactive components, preferably non-reactive branched urethane or urea components.

The curable cross-linker is a radiation curable component of the primary coating composition, and as such it includes one or more functional groups capable of participating in the covalent bonding or cross-linking of the cross-linker into the polymeric coating (see FIG. 3). Exemplary functional groups capable of participating in the cross-linking include α,β-unsaturated ester, amide, imide or vinyl ether groups.

As noted above, the curable cross-linker is essentially free of (thio) urethane or urea groups. By "essentially free" it is preferable that less than 1 weight percent of the curable cross-linker component includes (thio) urethane or urea groups. In preferred embodiments, less than 0.5 weight percent of the total curable cross-linker component includes urethane or urea groups. In most preferred embodiments, the curable cross-linker component is entirely free of both (thio) urethane and urea groups.

When identifying certain groups, such as urethane and thiourethane groups, or isocyanate or thioisocyanate groups, these groups may be generically identified as (thio) urethane or (thio) isocyanate or di(thio) isocyanate to indicate that the sulfur atom may or may not be present in the group.

In certain embodiments, the curable cross-linker component includes one or more polyols that contain two or more α,β-unsaturated ester, amide, imide, or vinyl ether groups, or combinations thereof. Exemplary classes of these polyol cross-linkers include, without limitation, polyol acrylates, polyol methacrylates, polyol maleates, polyol fumarates, polyol acrylamides, polyol maleimides or polyol vinyl ethers comprising more than one acrylate, methacrylate, maleate, fumarate, acrylamide, maleimide or vinyl ether group. The polyol moiety of the curable cross-linker can be a polyether polyol, a polyester polyol, a polycarbonate polyol, or a hydrocarbon polyol.

The curable cross-linker component preferably has a molecular weight of between about 250 and about 15000 daltons, in some embodiments more preferably between about 300 and about 9000 daltons, in some embodiments preferably between about 1500 and about 5000 daltons, in other embodiments preferably between about 300 and about 1000 daltons.

The curable cross-linker component is present in the radiation curable composition in an amount of about 4 to about 60 percent by weight, more preferably about 4 to about 50 percent by weight, most preferably about 4 to about 40 percent by weight.

The curable diluent is a generally lower molecular weight (i.e., about 120 to 600 daltons) liquid monomer that is added to the formulation to provide the liquidity needed to apply the coating composition with conventional liquid coating equipment. The curable diluent contains at least one functional group that allows the diluent, upon activation, to link to the polymer with the curable cross-linker components (see FIG. 3). These functional groups include, without limitation, acrylate, methacrylate, maleate, fumarate, maleimide, vinyl ether, and acrylamide groups.

Monofunctional diluents will contain only a single reactive functional group, whereas polyfunctional diluents will contain two or more reactive functional groups. Whereas the former can link to the polymer network during curing, the latter can form cross-links within the polymer network.

When it is desirable to utilize moisture-resistant components, the diluent component will be selected on the basis of its compatibility with the selected moisture-resistant cross-linker(s) or component(s). Not all such liquid monomers may be successfully blended and copolymerized with the moisture-resistant cross-linker(s) or component(s), because such cross-linker(s) or component(s) are highly non-polar. For satisfactory coating compatibility and moisture resistance, it is desirable to use a liquid acrylate monomer component comprising a predominantly saturated aliphatic mono- or di-acrylate monomer or alkoxy acrylate monomers.

Suitable polyfunctional ethylenically unsaturated monomers include, without limitation, methylolpropane polyacrylates with and without alkoxylation such as ethoxylated trimethylolpropane triacrylate with ethoxylation being 3 or greater, preferably ranging from 3 to about 30 (Photomer 4149 available from Cognis Corp., and SR499 available from Sartomer Company, Inc.), propoxylated trimethylolpropane triacrylate with propoxylation being 3 or greater, preferably ranging from 3 to 30 (Photomer 4072 available from Cognis Corp.; and SR492 and SR501 available from Sartomer Company, Inc.), and ditrimethylolpropane tetraacrylate (Photomer 4355 available from Cognis Corp.); alkoxylated glyceryl triacrylates such as propoxylated glyceryl triacrylate with propoxylation being 3 or greater (Photomer 4096 available from Cognis Corp.; and SR9020 available from Sartomer Company, Inc.); erythritol polyacrylates with and without alkoxylation, such as pentaerythritol tetraacrylate (SR295 available from Sartomer Company, Inc.), ethoxylated pentaerythritol tetraacrylate (SR494 available from Sartomer Company, Inc.), and dipentaerythritol pentaacrylate (Photomer 4399 available from Cognis Corp.; and SR399 available from Sartomer Company, Inc.); isocyanurate polyacrylates formed by reacting an appropriate functional isocyanurate with an acrylic acid or acryloyl chloride, such as tris-(2-hydroxyethyl)isocyanurate triacrylate (SR368 available from Sartomer Company, Inc.) and tris-(2-hydroxyethyl)isocyanurate diacrylate; alcohol polyacrylates with and without alkoxylation such as tricyclodecane dimethanol diacrylate (CD406 available from Sartomer Company, Inc.), alkoxylated hexanediol diacrylate (CD564 available from Sartomer Company, Inc.), tripropylene glycol diacrylate (SR306 available from Sartomer Company, Inc.)

and ethoxylated polyethylene glycol diacrylate with ethoxylation being 2 or greater, preferably ranging from about 2 to 30; epoxy acrylates formed by adding acrylate to bisphenol A diglycidylether and the like (Photomer 3016 available from Cognis Corp.); and single and multi-ring cyclic aromatic or non-aromatic polyacrylates such as dicyclopentadiene diacrylate.

It may also be desirable to use certain amounts of monofunctional ethylenically unsaturated monomers, which can be introduced to influence the degree to which the cured product absorbs water, adheres to other coating materials, or behaves under stress. Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate (SR440 available from Sartomer Company, Inc. and Ageflex FA8 available from CPS Chemical Co.), 2-ethylhexyl acrylate, nonyl acrylate, decyl acrylate, isodecyl acrylate (SR395 available from Sartomer Company, Inc.; and Ageflex FA10 available from CPS Chemical Co.), undecyl acrylate, dodecyl acrylate, tridecyl acrylate (SR489 available from Sartomer Company, Inc.), lauryl acrylate (SR335 available from Sartomer Company, Inc., Ageflex FA12 available from CPS Chemical Co., Old Bridge, N.J.), and (Photomer 4812 available from Cognis Corp.), octadecyl acrylate, and stearyl acrylate (SR257 available from Sartomer Company, Inc.); aminoalkyl acrylates such as dimethylaminoethyl acrylate, diethylaminoethyl acrylate, and 7-amino-3,7-dimethyloctyl acrylate; alkoxyalkyl acrylates such as butoxylethyl acrylate, phenoxyethyl acrylate (SR339 available from Sartomer Company, Inc., Ageflex PEA available from CPS Chemical Co., and Photomer 4035 available from Cognis Corp.), phenoxyglycidyl acrylate (CN131 available from Sartomer Company, Inc.), lauryloxyglycidyl acrylate (CN130 available from Sartomer Company, Inc.), and ethoxyethoxyethyl acrylate (SR256 available from Sartomer Company, Inc.); single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (SR423 and SR506 available from Sartomer Company, Inc., and Ageflex IBOA available from CPS Chemical Co.), tetrahydrofurfuryl acrylate (SR285 available from Sartomer Company, Inc.), caprolactone acrylate (SR495 available from Sartomer Company, Inc.; and Tone M100 available from Union Carbide Company, Danbury, Conn.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (Photomer 4003 available from Cognis Corp.; and SR504 available from Sartomer Company, Inc.) and propoxylatednonylphenol acrylate (Photomer 4960 available from Cognis Corp.); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam (both available from International Specialty Products, Wayne, N.J.); and acid esters such as maleic acid ester and fumaric acid ester.

The curable diluent is typically present in the coating composition in amounts of about 10 to about 60 percent by weight, more preferably between about 20 to about 50 percent by weight, and most preferably between about 25 to about 45 percent by weight. The curable diluent can include a single diluent component, or combinations of two or more diluent components.

The non-radiation curable component is a relatively high-molecular weight component that includes (thio)urethane and/or urea groups, that, although incapable of covalently binding the component to the cured product, participate in hydrogen bond interactions (or physical links) between the non-radiation curable component and other components of the cured polymer product (see FIG. 3).

The non-radiation curable component contains a core moiety covalently linked to two or more block moieties that comprise the (thio)urethane and/or urea groups, and terminate in a non-radiation curable capping agent. Each of the block moieties contains one or more soft blocks and optionally one or more hard blocks, wherein the average weight ratio of the soft blocks to hard blocks is at least 3:1. The soft blocks are the reaction products of a di(thio)isocyanate and a polyol or amine-capped polyol, whereas the hard blocks are the reaction products of a di(thio)isocyanate and a diol or diamine comprising a hydrocarbon or oxygen-containing hydrocarbon having an average molecular weight of between about 28 to about 400.

The core moiety may be covalently linked to two block moieties, in which case the non-radiation curable component is said to have a linear structure as illustrated below:

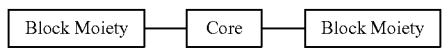

The core moiety may be covalently linked top block moieties, where p is greater than 2, in which case the non-radiation curable component is said to have a branched structure as illustrated below:

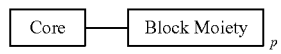

Within each of the block moieties, the number and orientation of the soft blocks and any hard blocks, if present, cannot be controlled precisely. Therefore, in the structures shown below, it is intended that the structures represent an average structure of the non-radiation curable components. Individual molecules within a single formulation may differ in the number and location of the different soft and hard blocks within the component relative to the average structure.

By way of example only, suitable configurations of soft and hard blocks include, without limitation: -Soft-Soft-Hard-CAP, -Soft-Hard-Soft-CAP, and -Hard-Soft-Soft-CAP for block moieties containing three blocks and capped with a non-reactive capping moiety (CAP); -Soft-Soft-Soft-Hard-CAP, -Soft-Soft-Hard-Soft-CAP, -Soft-Hard-Soft-Soft-CAP, -Hard-Soft-Soft-Soft-CAP, -Hard-Soft-Hard-Soft-CAP, -Hard-Soft-Soft-Hard-CAP, -Soft-Hard-Soft-Hard-CAP for block moieties containing four blocks and capped with a non-reactive capping moiety (CAP); -Soft-Soft-Soft-Soft-Hard-CAP, -Soft-Soft-Soft-Hard-Soft-CAP, -Soft-Soft-Hard-Soft-Soft-CAP, -Soft-Hard-Soft-Soft-Soft-CAP, -Hard-Soft-Soft-Soft-Soft-CAP, -Soft-Soft-Hard-Soft- Hard-CAP, -Soft-Hard-Soft-Hard-Soft-CAP, -Soft-Hard-Soft-Soft-Hard-CAP, -Hard-Soft-Hard-Soft-Soft-CAP, -Hard-Soft-Soft-Hard-Soft-Soft-CAP, and -Hard-Soft-Soft-Soft-Hard-CAP for block moieties containing five blocks and capped with a non-reactive capping moiety (CAP); -Soft-Soft-Soft-Soft-Soft-Hard-CAP, -Soft-Soft-Soft-Soft-Hard-Soft-CAP, -Soft-Soft-Soft-Hard-Soft-Soft-CAP, -Soft-Soft-Hard-Soft-Soft-Soft-CAP, -Soft-Hard-Soft-Soft-Soft-Soft-CAP, -Hard-Soft-Soft-Soft-Soft-Soft-CAP, -Hard-Soft-Soft-Soft-Soft-Hard-CAP, -Hard-Soft-Soft-Soft-Hard-Soft-CAP, -Hard-Soft-Soft-Hard-Soft-Soft-CAP, -Hard-Soft-Hard-Soft-Soft-Soft-CAP, -Soft-Hard-Soft-Soft-Soft-Hard-CAP, -Soft-Hard-Soft-Soft-Hard-Soft-CAP, -Soft-Hard-Soft-Hard-Soft-Soft-CAP, -Soft-Soft-Hard-Soft-Soft-Hard-CAP, -Soft-Soft-Hard-Soft-Hard-Soft-CAP, and -Soft-Soft-Soft-Hard-Soft-Hard-CAP for block moieties containing six blocks and capped with a non-reactive capping moiety (CAP); etc.

In one embodiment, the non-radiation curable components have the average structure according to formulae (Ia) or (Ib) shown below:

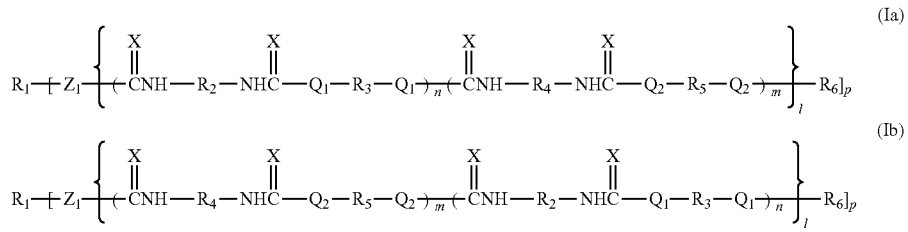

wherein, $R_1$ is a core moiety of a multifunctional reactant, where the number of functional groups of the core moiety is defined by p, where p is 2 or greater;

each X is independently S or O;

$Z_1$ is —O—, —S—, —N(H)—, or —N(alkyl)-, preferably —O— or —N(H)—;

each of $Q_1$ and $Q_2$ is independently —O—, —S—, —N(H)—, or —N(alkyl)-, preferably —O— or —N(H)—;

each of $R_2$ and $R_4$ is a core moiety of a di(thio)isocyanate reactant;

$R_3$ is a core moiety of a polyol or amine-capped polyol reactant;

$R_5$ is a hydrocarbon or oxygen-containing hydrocarbon having an average molecular weight of between about 28 to about 400;

$R_6$ is represented by the structure according to formula (II) or (III)

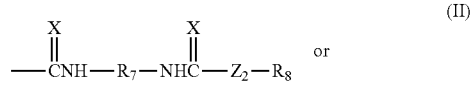

where X is defined as above, $Z_2$ is —O—, —S—, —N(H)—, or —N(alkyl)-, preferably —O— or —N(H)—, $R_7$ is a core moiety of a di(thio)isocyanate reactant, $R_8$ is a non-radiation curable capping agent, and $R_9$ is a core moiety of an isocyanate or thioisocyanate reactant;

l is 1 to 6;

m is greater than or equal to 0, preferably 1 to 4, more preferably 1 to 3; and n is greater than or equal to 1, preferably 2 to 10, more preferably 2 to 6.

In the structures of formulae (Ia) and (Ib), the block moiety is the region within square brackets defined by variable p; a soft block is the region within round brackets defined by variable n or the moiety defined as formula (II); and the hard block is the region within round brackets defined by variable m.

The core moiety ($R_1$) present in the non-radiation curable component is the reaction product of a multifunctional core reactant. The functional groups can be hydroxyl groups or amino groups. Preferably, the multifunctional core reactant is a polyol or an amine-capped polyol. Examples of these core reactants and their number of functional groups (p) include, without limitation, glycerol, where p=3; trimethylol propane, where p=3; pentaerythritol, where p=4; ditrimethylol propane, where p=4; ethylenediamine tetrol, where p=4; xylitol, where p=5; dipentaerythritol, where p=6; sucrose and other disaccharides, where p=8; alkoxylated derivatives thereof; dendrimers where p is from about 8 to about 32, such as poly(amidoamine) (PAMAM) dendrimers with G1 (p=8), G2 (p=16), or G3 (p=32) amine groups or PAMAM-OH dendrimers with G1 (p=8), G2 (p=16), or G3 (p=32) hydroxyl groups; and combinations thereof.

$R_2$, $R_4$, and $R_7$ independently represent the core moiety of a di(thio)isocyanate reactant. This includes both diisocyanates and dithioisocyanates, although diisocyanates are preferred. Although any diisocyanates and dithioisocyanates can be used, preferred $R_2$, $R_4$, and $R_7$ core groups of these diisocyanates and dithioisocyanates include the following:

| Reactant Name | $R_2$ or $R_4$ or $R_7$ Core Moiety |
|---|---|
| 4,4'-methylene bis(cyclohexyl) diisocyanate (HMDI) | [structure] |
| toluene diisocyanate (TDI) | [structure] |
| Isophorone diisocyanate (IPDI) | [structure] |
| Tetramethyl-1,3-xylylene diisocyanate (XDI) | [structure] |
| 4,4'-methylene bis(phenyl) diisocyanate (MDI) | [structure] |
| p-phenylene diisocyanate (PDI) | [structure] |
| Alkyl diisocyanates | —$(CH_2)_q$— where q is 2 to 12, preferably 6 |

$R_3$ is a core moiety of a polyol or amine-capped polyol reactant that preferably has a number average molecular weight of greater than or equal to about 400. In certain embodiments, the polyol or amine-capped polyol has a number average molecular weight between about 1000 and about 9000, between about 2000 and 9000, or between about 4000 and 9000. Examples of suitable $R_3$-forming polyols include, without limitation, polyether polyols such as poly(propylene glycol)[PPG], poly(ethylene glycol)[PEG], poly(tetramethylene glycol) [PTMG] and poly(1,2-butylene glycol); polycarbonate polyols; polyester polyols; hydrocarbon polyols such as hydrogenated poly(butadiene) polyols; amine-capped derivatives of these polyols, and any combinations thereof.

$R_5$ is a hydrocarbon or oxygen-containing hydrocarbon, which is preferably saturated, and has an average molecular weight of between about 28 to about 400. Thus, $R_5$ is the core moiety of a low molecular weight diol (to form urethane linkages) or diamine (to form urea linkages) reactant that acts analogously to a chain extender in a polyurethane. Exemplary reactants include, without limitation, 1,4-butanediol, 1,6-butanediol, ethylene diamine, 1,4-butanediamine, and 1,6-hexanediamine. As noted above, these chain extender based urethane or urea groups are expected to result in "hard block" areas along the block moiety branch(es) that promote more effective hydrogen bonding branch interactions than would the simple urethane (or urea) linkages resulting from polyol (or amine capped polyol)/isocyanate links. Where m is 0, the hard block is not present.

$R_8$ is the reaction product of a non-radiation curable capping agent, which caps the reactive isocyanate group at the end of a block moiety branch. These agents are preferably monofunctional alcohols (or amines) that will react with residual isocyanate groups at the end of a branch. Examples of these reactants include, without limitation, 1-butanol, 1-octanol, poly(propylene glycol) monobutyl ether, and 2-butoxyethanol.

$R_9$ is a core moiety of an (thio)isocyanate reactant. Any suitable mono-functional (thio)isocyanate can be used for this purpose. Exemplary (thio)isocyanate reactants that can serve as non-reactive capping agent for an arm of the component include, without limitation, methyl isocyanate, ethyl isocyanate, n-propyl isocyanate, i-propyl isocyanate, n-butyl isocyanate, i-butyl isocyanate, n-pentyl isocyanate, n-hexyl isocyanate, n-undecylisocyanate, chloromethyl isocyanate, β-chloroethyl isocyanate, γ-chloropropyl isocyanate, ethoxycarbonylmethyl isocyanate, β-ethoxyethyl isocyanate, α-ethoxyethyl isocyanate, α-butoxyethyl isocyanate, α-phenoxyethylisocyanate, cyclopentyl isocyanate, cyclohexyl isocyanate, methyl isothiocyanate, and ethyl isothiocyanate.

In certain embodiments the non-radiation curable components of the present invention, each branch or block moiety preferably has a molecular weight of at least about 1000, preferably at least about 2000, more preferably at least about 3000. In certain embodiments, each branch has a molecular weight of about 3000 to about 15000 daltons, more preferably between about 3000 and about 12000 daltons. Consequently, the non-radiation curable component preferably has a molecular weight of between about 4000 and about 50000 daltons, more preferably between about 6000 and about 35000 daltons, even more preferably between about 8000 and about 25000 daltons.

The degree of intra- and inter-component interactions through hydrogen bonding can be adjusted by varying the molecular weight of the polyol or amine-capped polyol used to form part of a branch or block moiety. For example, one could use a single soft block with a molecular weight of about 8000 or multiple (n) soft blocks having a lower molecular weight but collectively having about the same overall molecular weight. In this example, the latter soft block will have more urethane/urea linkages and would be expected to hydrogen bond more effectively. As noted above, these interactions can also be promoted by the inclusion of optional chain extender based hard blocks. The number of urethane/urea linkages and the numbers of soft and hard blocks can be adjusted through the number of n and m blocks as well as the n/m ratio. As will be appreciated by one of ordinary skill in the art, while these hydrogen bonding interactions demonstrate expected increases in cured coating integrity and performance, strong intra-component interactions also may in some circumstances limit the solubility of the component in a coating formulation or lead to physical gelation of an component during synthesis or after it has been mixed into a formulation but before radiation-induced curing has occurred.

The non-radiation curable component components can be prepared using standard reactions between isocyanate groups and hydroxyl groups (to form urethane linkages) or amine groups (to form urea linkages). By way of example, molar measures of the desired reactants can be mixed together in a reaction vessel, with stirring, and maintained at a suitable temperature of about 45 to about 80° C., preferably about 70° C., for a duration suitable to allow each step of the reaction to complete. Typically, 30 to 90 minutes is sufficient in this regard depending upon the reaction temperature. To facilitate handling of the components during synthesis, especially those with high viscosity, one or more of the radiation curable diluents used in the final formulation—such as one of those listed above—can be used as a non-reactive diluent during the component synthesis.

Figure 4:
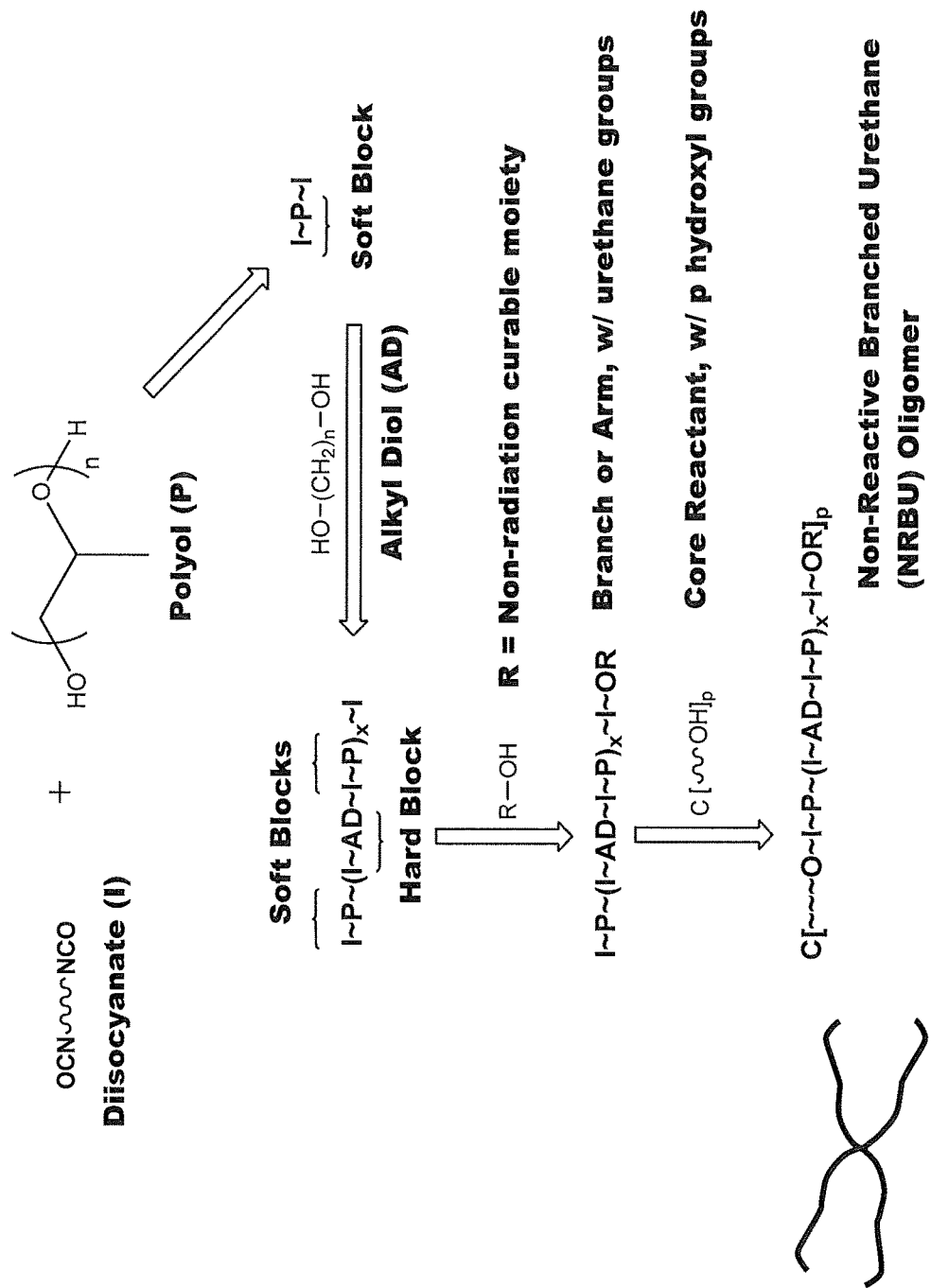
FIG. 4 illustrates one embodiment for forming non-reactive branched urethane/urea components using standard reactions between (thio)isocyanate groups and hydroxyl groups (to form urethane linkages) or amine groups (to form urea linkages).

Referring now to FIG. 4, in one embodiment the reaction proceeds by first forming the soft blocks using appropriate molar amounts of the polyol or amine-capped polyol reactant and diisocyanates described above, followed by the introduction of diol or diamine reactants to produce hard blocks, if desired, in an appropriate molar ratio, and finally by the introduction of end-capping reactants to complete each arm or branch of the final component. Once the arms have been prepared, the core moiety ($R_1$) multifunctional reactant is introduced in an appropriate molar ratio to form the linear or branched non-reactive component.

Exemplary non-radiation curable components include, without limitation, components having the average structures shown in Table 1 below (see Example 1, infra).

Once the component synthesis is complete, the non-radiation curable component can be used to formulate one of the primary coating compositions of the present invention. The non-radiation curable component is preferably present in an amount of about 10 to about 35 percent by weight, more preferably about 12 to about 28 percent by weight, most preferably about 15 to about 25 percent by weight.

In certain embodiments, the primary coating composition of the present invention includes about 4 to about 60 percent by weight of the curable cross-linker, about 10 to about 60 percent by weight of the curable diluent, and about 10 to about 35 percent by weight of the non-radiation curable component.

In another embodiment, the primary coating composition of the present invention includes about 4 to about 50 percent by weight of the curable cross-linker, about 4 to about 50 percent by weight of the curable diluent, and about 12 to about 35 percent by weight of the non-radiation curable component.

In another embodiment, the primary coating composition of the present invention includes about 4 to 40 percent by weight of the curable cross-linker, about 25 to about 50 percent by weight of the curable diluent, and about 15 to about 35 percent by weight of the non-radiation curable component.

As used herein, the weight percent of a particular component refers to the amount introduced into the bulk composition excluding any additives. The amount of additives that are introduced into the bulk composition to produce a composition of the present invention is listed in parts per hundred. For example, the cross-linker and non-radiation curable components, diluent, and a polymerization initiator can be combined to form the bulk composition such that the total weight percent of these components equals 100 percent. To this bulk composition, an amount of a particular additive, for example 1 part per hundred, is introduced in excess of the 100 weight percent of the bulk composition.

In addition to the curable cross-linker, curable diluent, and non-radiation curable component, the primary coating compositions of the present invention may also include one or more of the following additional components or additives: a polymerization initiator, an adhesion promoter, an antioxidant, a catalyst, a carrier or surfactant, a tackifier, a stabilizer, and an optical brightener. Some additives, for example, catalysts, reactive surfactants, and optical brighteners, can operate to control the polymerization process, thereby affecting the physical properties (e.g., modulus, glass transition temperature) of the polymerization product formed from the coating composition. Others can affect the integrity of the polymerization product of the coating composition (e.g., protect against de-polymerization or oxidative degradation).

As is well known in the art, a polymerization initiator is a reagent that is suitable to cause polymerization (i.e., curing) of the composition after its application to a glass fiber. Polymerization initiators suitable for use in the primary coating compositions of the present invention include thermal initiators, chemical initiators, electron beam initiators, and photoinitiators. Particularly preferred are the photoinitiators. For most acrylate-based coating formulations, conventional photoinitiators, such as the known ketonic photoinitiators and/or phosphine oxide photoinitiators, are preferred. When used in the compositions of the present invention, the photoinitiator is present in an amount sufficient to provide rapid ultraviolet curing. Generally, this includes between about 0.5 to about 10.0 percent by weight, more preferably between about 1.5 to about 7.5 percent by weight.

The photoinitiator, when used in a small but effective amount to promote radiation cure, should provide reasonable cure speed without causing premature gelation of the coating composition. A desirable cure speed is any speed sufficient to cause substantial curing of the coating materials. As measured in a dose versus modulus curve, a cure speed for coating thicknesses of about 25-35 µm is, e.g., less than 1.0 $J/cm^2$, preferably less than 0.5 $J/cm^2$.

Suitable photoinitiators include, without limitation, 1-hydroxycyclohexylphenyl ketone (Irgacure 184 available from Ciba Specialty Chemical, Hawthorne, N.Y.), (2,6-dimethoxybenzoyl)-2,4,4-trimethylpentyl phosphine oxide (commercial blends Irgacure 1800, 1850, and 1700 available from Ciba Specialty Chemical), 2,2-dimethoxyl-2-phenyl acetophenone (Irgacure 651, available from Ciba Specialty Chemical), bis(2,4,6-trimethyl benzoyl)phenyl-phosphine oxide (Irgacure 819, available from Ciba Specialty Chemical), (2,4,6-trimethylbenzoyl)diphenyl phosphine oxide (Lucerin TPO available from BASF, Munich, Germany), ethoxy (2,4,6-trimethylbenzoyl)phenyl phosphine oxide (Lucerin TPO-L from BASF), and combinations thereof.

As is well known in the art, an adhesion promoter enhances the adhesion of the primary coating to the underlying glass fiber. Any suitable adhesion promoter can be employed. Examples of a suitable adhesion promoter include, without limitation, organofunctional silanes, titanates, zirconates, and mixtures thereof. One preferred class are the poly(alkoxy)silanes. Suitable alternative adhesion promoters include, without limitation, bis(trimethoxysilylethyl)benzene, 3-mercaptopropyltrimethoxysilane (3-MPTMS, available from United Chemical Technologies, Bristol, Pa.; also available from Gelest, Morrisville, Pa.), 3-acryloxypropyltrimethoxysilane (available from Gelest), and 3-methacryloxypropyltrimethoxysilane (available from Gelest), and bis(trimethoxysilylethyl)benzene (available from Gelest). Other suitable adhesion promoters are described in U.S. Pat. Nos. 4,921,880 and 5,188,864 to Lee et al., each of which is hereby incorporated by reference. The adhesion promoter, if present, is used in an amount between about 0.1 to about 10 pph, more preferably about 0.25 to about 3 pph.

Any suitable antioxidant can be employed. Preferred antioxidants include, without limitation, bis hindered phenolic sulfide or thiodiethylene bis(3,5-di-tert-butyl)-4-hydroxyhydrocinnamate (Irganox 1035, available from Ciba Specialty Chemical). The antioxidant, if present, is used in an amount between about 0.1 to about 3 pph, more preferably about 0.25 to about 2 pph.

An exemplary catalyst is a tin-catalyst, which is used to catalyze the formation of urethane bonds in some non-radiation curable components. Whether the catalyst remains as an additive of the non-radiation curable component or additional quantities of the catalyst are introduced into the composition of the present invention, the presence of the catalyst can act to stabilize the non-radiation curable component(s) in the composition.

Suitable carriers, more specifically carriers which function as reactive surfactants, include polyalkoxypolysiloxanes. Preferred carriers are available from Goldschmidt Chemical Co. (Hopewell, Va.) under the tradename TEGORAD 2200 and TEGORAD 2700 (acrylated siloxane). These reactive surfactants may be present in a preferred amount between about 0.01 to about 5 pph, more preferably about 0.25 to about 3 pph. Other classes of suitable carriers are polyols and non-reactive surfactants. Examples of suitable polyols and non-reactive surfactants include, without limitation, the polyol Acclaim 3201 (poly(ethylene oxide-co-propylene oxide)) available from Bayer (Newtown Square, Pa.), and the non-reactive surfactant Tegoglide 435 (polyalkoxy-polysiloxane) available from Goldschmidt Chemical Co. The polyol or non-reactive surfactants may be present in a preferred amount between about 0.01 pph to about 10 pph, more preferably about 0.05 to about 5 pph, most preferably about 0.1 to about 2.5 pph.

Suitable carriers may also be ambiphilic molecules. An ambiphilic molecule is a molecule that has both hydrophilic and hydrophobic segments. The hydrophobic segment may alternatively be described as a lipophilic (fat/oil loving) segment. A tackifier is an example of one such ambiphilic molecule. A tackifier is a molecule that can modify the time-sensitive rheological property of a polymer product. In general a tackifier additive will make a polymer product act stiffer at higher strain rates or shear rates and will make the polymer product softer at low strain rates or shear rates. A tackifier is an additive that is commonly used in the adhesives industry, and is known to enhance the ability of a coating to create a bond with an object that the coating is applied upon. One preferred tackifier is Uni-tac® R-40 (hereinafter "R-40") available from International Paper Co., Purchase, N.Y. R-40 is a tall oil rosin, which contains a polyether segment, and is from the chemical family of abietic esters. A suitable alternative tackifier is the Escorez series of hydrocarbon tackifiers available from Exxon. For additional information regarding Escorez tackifiers, see U.S. Pat. No. 5,242,963 to Mao, which is hereby incorporated by reference in its entirety. The aforementioned carriers may also be used in combination. Preferably, the tackifier is present in the composition in an amount between about 0.01 to about 10 pph, more preferably in the amount between about 0.05 to about 5 pph.

Any suitable stabilizer can be employed. One preferred stabilizer is a tetrafunctional thiol, e.g., pentaerythritol tetrakis(3-mercaptopropionate) from Sigma-Aldrich (St. Louis, Mo.). The stabilizer, if present, is used in an amount between about 0.01 to about 1 pph, more preferably about 0.01 to about 0.2 pph.

Any suitable optical brightener can be employed. Exemplary optical brighteners include, without limitation, Uvitex OB, a 2,5-thiophenediylbis(5-tert-butyl-1,3-benzoxazole) (Ciba Specialty Chemical); Blankophor KLA, available from Bayer; bisbenzoxazole compounds; phenylcoumarin compounds; and bis(styryl)biphenyl compounds. The optical brightener is desirably present in the composition at a concentration of about 0.003 to about 0.5 pph, more preferably about 0.005 to about 0.3 pph.

A number of preferred primary coating compositions include compositions 4, 6, 7, 13, 14 (including 14A,B), and 15 as described in Example 2, infra.

The secondary or outer coating 26 is typically the polymerization product of a coating composition that contains urethane acrylate liquids whose molecules become highly cross-linked when polymerized. The cured polymeric material of the secondary coating 26 has a Young's modulus of at least about 1200 MPa, preferably at least about 1500 MPa, more preferably at least about 1900 MPa. The cured polymeric material of secondary coating 26 has an elongation to break of at least about 30%, preferably at least about 40%. The cured polymeric material of secondary coating 26 has an average tensile strength of at least about 45 MPa, more preferably at least about 50 or 55 MPa, most preferably at least about 60 MPa. The $T_g$ is preferably between about 50° C. and about 120° C., more preferably between about 50° C. and about 100° C. The secondary coating 26 typically has a thickness of about 20 to about 35 μm, preferably about 25 to about 27 μm.

Other suitable materials for use in secondary coatings, as well as considerations related to selection of these materials, are well known in the art and are described in U.S. Pat. Nos. 4,962,992 and 5,104,433 to Chapin, each of which is hereby incorporated by reference in its entirety.

The secondary coatings are typically applied to the previously coated fiber (either with or without prior curing) and subsequently cured, as will be described in more detail herein below. Various additives that enhance one or more properties of the coating can also be present, including antioxidants, catalysts, lubricants, low molecular weight non-crosslinking resins, stabilizers, surfactants, surface agents, slip additives, waxes, micronized-polytetrafluoroethylene, etc. The secondary coating may also include an ink, as is well known in the art.

Another aspect of the present invention relates to a method of making an optical fiber including the primary coating described hereinabove. This method can generally be performed by standard methods with the use of a composition of the present invention. Briefly, the process involves fabricating the glass fiber (using methods familiar to the skilled artisan), applying a primary coating composition to the glass fiber, polymerizing the primary coating composition to form the primary coating material, applying the curable composition described hereinabove to the coated glass fiber, and polymerizing the curable composition to form the cured polymeric material as the secondary coating of the optical fiber. This is known as a "wet-on-dry" process. Optionally, the secondary coating composition can be applied to the coated fiber before polymerizing the primary coating composition, in which case only a single polymerization step is employed. This is known as a "wet-on-wet" process.

The primary and secondary coating compositions are coated on a glass fiber using conventional processes, for example, on a draw tower. It is well known to draw glass fibers from a specially prepared, cylindrical preform which has been locally and symmetrically heated to a temperature, e.g., of about 2000° C. As the preform is heated, such as by feeding the preform into and through a furnace, a glass fiber is drawn from the molten material. One or more coating compositions are applied to the glass fiber after it has been drawn from the preform, preferably immediately after cooling. The coating compositions are then cured to produce the coated optical fiber. The method of curing can be thermal, chemical, or radiation induced, such as by exposing the applied (and un-cured) coating composition on the glass fiber to ultraviolet light, actinic radiation, microwave radiation, or electron beam, depending upon the nature of the coating composition(s) and polymerization initiator being employed. One method of applying dual layers of coating compositions to a moving glass fiber is disclosed in U.S. Pat. No. 4,474,830 to Taylor, which is hereby incorporated by reference in its entirety. Another method for applying dual layers of coating compositions onto a glass fiber is disclosed in U.S. Pat. No. 4,581,165 to Rannell et al., which is hereby incorporated by reference in its entirety.

Figure 2:
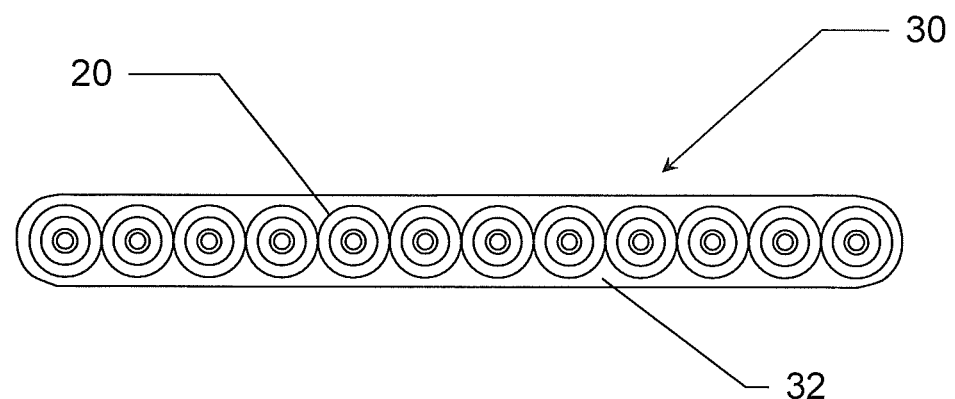
FIG. 2 is a schematic view of an optical fiber ribbon according to an embodiment of the present invention. Although the ribbon shown includes twelve coated optical fibers, it should be appreciated by skilled artisans that any number of optical fibers may be included in the ribbon.

Referring now to FIG. 2, another aspect of the present invention relates to an optical fiber ribbon 30. The ribbon 30 includes a plurality of optical fibers 20 and a matrix 32 encapsulating the plurality of optical fibers. The optical fibers 20 are substantially aligned relative to one another in a substantially planar relationship. It is desirable that optical fibers 20 are not displaced from a common plane by a distance of more than about one-half the diameter thereof. By "substantially aligned", it is intended that the optical fibers 20 are generally parallel with other optical fibers along the length of the fiber optic ribbon 30. The optical fibers in fiber optic ribbons of the present invention may be encapsulated by the matrix 32 in any known configuration (e.g., edge-bonded ribbon, thin-encapsulated ribbon, thick-encapsulated ribbon, or multi-layer ribbon) by conventional methods of making fiber optic ribbons. In FIG. 2, the fiber optic ribbon 30 contains twelve (12) optical fibers 20; however, it should be apparent to those skilled in the art that any number of optical fibers 20 (e.g., two or more) may be employed to form fiber optic ribbon 30 disposed for a particular use.

The matrix can be any suitable secondary coating composition as described above. The matrix can be formed from the same composition used to prepare the secondary coating 26, or the matrix can be formed from a different composition that is otherwise compatible for use. The skilled artisan will appreciate that the optical fibers 20 may include a dual-layer coating system (for example, the primary and secondary coatings described hereinabove), and may be colored with a marking ink.

The fiber optic ribbon may be prepared by conventional methods using an optical fiber containing a primary coating of the present invention. For example, upon alignment of a plurality of substantially planar optical fibers of the present invention, the matrix composition can be applied and cured according to the methods of preparing optical fiber ribbons as described in U.S. Pat. No. 4,752,112 to Mayr and U.S. Pat. No. 5,486,378 to Oestreich et al., which are hereby incorporated by reference in their entirety.

EXAMPLES

The following Examples are intended to illustrate the claimed invention, and are not intended to be limiting.

Example 1—Component Synthesis

In the following synthesis schemes, poly(propylene glycol), dibutyltin dilaurate, 2,6-di-tert-butyl-4-methylphenol (BHT), 4,4'-methylenebis(cyclohexyl-isocyanate) (H12MDI), isophorone diisocyanate (IPDI), 1,4-butanediol, 2-butoxyethanol, propoxylated pentaerythritol (PO/OH~17/8), Tetronic 701 and poly(propylene glycol) 900 diacrylate (PPGDA900) were purchased from Aldrich Chemical Co. Tetronic 701 is an ethylenediamine tetrakis(propoxylate-block-ethoxylate)tetrol having a number average molecular weight of 3600. Photomer 4003 (ethoxylated nonylphenol acrylate) and isobornyl acrylate (IBOA) are available from IGM Resins. SR495, caprolactone acrylate, was from Sartomer. Lucerin TPO is available from BASF. All materials were used as received.

Poly(propylene glycol) 2000 diacrylate (PPG2000DA) was prepared by using the process reported by Malucelli et al., "Synthesis of Poly(propylene-glycol-diacrylates) and Properties of the Photocured Networks," *J. Appl. Polymer Sci.* 65(3): 491-497 (1997), which is hereby incorporated by reference in its entirety.

Table 1 below illustrates average structures for components synthesized in accordance with the present invention. In general, synthesis followed the exemplary protocol illustrated in FIG. 4, whereby a diisocyanate was first reacted with a polyol (e.g., polypropylene glycol) to form a soft block reactant (designated I~P~I in FIG. 4). The use of the polyol and diisocyanate forms urethane groups within the soft block reactant; however, if an amine-capped polyol was instead used, then urea groups would be formed within the soft block reactant. Next, the soft block reactant (I~P~I) was reacted with a saturated hydrocarbon diol (e.g., 1,4-butanediol or BD) to form a hard block moiety sandwiched between two soft block moieties. The average structure of the thus-formed component is designated as I~P~(I~B-D~I~P)$_x$~I in FIG. 4. The average length of the component, and the number of hard block moieties present in the component, can be controlled by adjusting the molar ratios of these reactants. The component reactant is then reacted with 2-butoxyethanol, a capping reagent that includes a single hydroxyl group capable of reacting with an isocyanate group present in the intermediate component designated as I~P~(I~BD~I~P)$_x$~I in FIG. 4. This effectively caps one end of the component with an unreactive capping moiety (e.g., butoxyethoxy), forming the final intermediate designated as I~P~(I~BD~I~P)$_x$~I~OR in FIG. 4. These end-capped final intermediates represent the arms of the end-product component to be formed. The final intermediate is then reacted with a multifunctional core reagent containing 2 or more functional groups, illustrated as the tetrol C[~OH]$_4$ (p=4) in FIG. 4, resulting in an component containing two or more block moieties (i.e., the arms) (four shown in FIG. 4) that contain (thio)urethane and/or urea groups, and terminate in a non-radiation curable capping agent. Each of the block moieties (or "arms") comprises one or more soft blocks and optionally one or more hard blocks, wherein the average weight ratio of the soft blocks to hard blocks is at least 3:1.

Preparation of Non-Reactive Branched Urethane Component 2:

To a mixture of 207.3 g H12MDI, 400 g Photomer 4003, 1.6 g 2,6-di-t-butyl-4-methylphenol and 0.5 g dibutyltin dilaurate was added dropwise over approximately one hour 471 g of poly(propylene glycol) having an M$_n$ of 1200. The reaction temperature was kept below 50° C. during the addition. When the addition was complete, residue in the addition funnel was flushed into the reactor with 25 g of Photomer 4003. The mixture was heated at approximately 70° C. for 1 h. Over 10 minutes, 17.75 g of 1,4-butanediol was added, followed by 25 g of Photomer 4003 to flush the addition funnel. The mixture was heated at approximately 70° C. for 1 h. Over 10 minutes, 23.3 g of 2-butoxyethanol was added, followed by 25 g of Photomer 4003 to flush the addition funnel. The mixture was heated at approximately 70° C. for 1 h. Over 10 minutes, 31 g of propoxylated pentaerythritol with molecular weight 629 was added, followed by 25 g of Photomer 4003 to flush the addition funnel. The mixture was heated at approximately 70° C. for 1 h, at which point the formation of the component was complete. Approximately 1197 g of component (96% mass recovery) was isolated.

Preparation of Non-Reactive Linear Urethane Component 3:

To a mixture of 150 g (0.0375 mol) of poly(propylene glycol) having an M$_n$ of 4000, 250 mg 2,6-di-t-butyl-4-methylphenol and 250 mg dibutyltin dilaurate was added dropwise over approximately 20 min 14.76 g (0.0563 mol) H12MDI. The reaction temperature was kept below 50° C. during the addition. The mixture was heated at approximately 70° C. for 3 h. Then 4.42 g (0.0375 mol) of 2-butoxyethanol was added over about 2 min. The mixture

TABLE 1

Average Structures For Non-reactive Branched or Linear Urethane Components

Name Composition

1  C[CH2(PO)$_2$~IPDI~P1200~IPDI~BD~IPDI~P1200~IPDI~O(CH2)$_2$OBu]$_4$
2  C[CH2(PO)$_2$~H12MDI~P1200~H12MDI~BD~H12MDI~P1200~H12MDI~O(CH2)$_2$OBu]$_4$
3  BuO(CH2)$_2$O~(H12MDI~P$_{4000}$)$_2$~H12MDI~O(CH2)$_2$OBu
4  Tetronic 701[IPDI~P1200~IPDI~BD~IPDI~P1200~IPDI~O(CH2)2OBu]$_4$
5  Tetronic 701[H12MDI~P1200~H12MDI~BD~H12MDI~P1200~H12MDI~O(CH2)2OBu]$_4$
6  C[CH2(PO)$_2$~IPDI~P4000~IPDI~BD~IPDI~P4000~IPDI~O(CH2)$_2$OBu]$_4$ Preparation of Non-Reactive Branched Urethane Component 1:

To a mixture of 198.1 g (0.89 mol) IPDI, 418 g Photomer 4003, 1.6 g 2,6-di-t-butyl-4-methylphenol and 0.5 g dibutyltin dilaurate was added dropwise 552.5 g (0.442 mol) of poly(propylene glycol) having an M$_n$ of 1250 from the reported hydroxyl number of 89.6. The reaction temperature was kept below 50° C. during the addition. When the addition was complete, residue in the addition funnel was flushed into the reactor with 25 g of Photomer 4003. The mixture was heated at approximately 70° C. for 1 h. Then 20.1 g (0.223 mol) of 1,4-butanediol was added, followed by 25 g of Photomer 4003 to flush the addition funnel. The mixture was heated at approximately 70° C. for 1 h. Then 26.3 g (0.223 mol) of 2-butoxyethanol was added, followed by 25 g of Photomer 4003 to flush the addition funnel. The mixture was heated at approximately 70° C. for 1 h. Then 35.1 g (0.056 mol) of propoxylated pentaerythritol with molecular weight 629 was added, followed by 25 g of Photomer 4003 to flush the addition funnel. The mixture was heated at approximately 70° C. for 1 h, at which point the formation of the component was complete. Approximately 1324 g of component (98% mass recovery) was isolated.

was heated at approximately 70° C. for 1 h, at which point the formation of the component was complete.

Preparation of Non-Reactive Branched Urethane Component 4:

To a mixture of 26.7 g (0.12 mol) IPDI, 50 g Photomer 4003, 150 mg 2,6-di-t-butyl-4-methylphenol and 150 mg dibutyltin dilaurate was added dropwise 71.5 g (0.06 mol) of poly(propylene glycol) having an M$_n$ of 1200. The reaction temperature was kept below 50° C. during the addition. The mixture was heated at approximately 70° C. for 1 h. Then 2.70 g of 1,4-butanediol was added, followed by 5 g of Photomer 4003 to flush the addition funnel. The mixture was heated at approximately 70° C. for 1 h. Then 3.54 g of 2-butoxyethanol was added, followed by 5 g of Photomer 4003 to flush the addition funnel. The mixture was heated at approximately 70° C. for 1 h. Then a mixture of 27 g (0.0075) of Tetronic 701 with a molecular weight of 3600 and 28 g of Photomer 4003 that had been pre-heated to 65° C. was added. The mixture was heated at approximately 70° C. for 1 h, at which point the formation of the component was complete.

Preparation of Non-Reactive Branched Urethane Component 5:

To a mixture of 31.5 g (0.12 mol) H12MDI, 50 g Photomer 4003, 150 mg 2,6-di-t-butyl-4-methylphenol and 150 mg dibutyltin dilaurate was added dropwise 71.5 g (0.06 mol) of poly(propylene glycol) having an $M_n$ of 1200. The reaction temperature was kept below 50° C. during the addition. The mixture was heated at approximately 70° C. for 1 h. Then 2.70 g of 1,4-butanediol was added, followed by 5 g of Photomer 4003 to flush the addition funnel. The mixture was heated at approximately 70° C. for 1 h. Then 3.54 g of 2-butoxyethanol was added, followed by 5 g of Photomer 4003 to flush the addition funnel. The mixture was heated at approximately 70° C. for 1 h. Then a mixture of 27 g (0.0075 mol) of Tetronic 701 with a molecular weight of 3600 and 31 g of Photomer 4003 that had been pre-heated to 65° C. was added. The mixture was heated at approximately 70° C. for 1 h, at which point the formation of the component was complete.

Preparation of Non-Reactive Branched Urethane Component 6:

To a mixture of 16.7 g (0.075 mol) IPDI, 76 g Photomer 4003, 150 mg 2,6-di-t-butyl-4-methylphenol and 150 mg dibutyltin dilaurate was added dropwise 150 g (0.0375 mol) of poly(propylene glycol) having an $M_n$ of 4000. The reaction temperature was kept below 50° C. during the addition. The mixture was heated at approximately 70° C. for 1 h. Then 1.69 g (0.01875 mol) of 1,4-butanediol was added, followed by 10 g of Photomer 4003 to flush the addition funnel. The mixture was heated at approximately 70° C. for 1 h. Then 2.21 g (0.01875 mol) of 2-butoxyethanol was added, followed by 10 g of Photomer 4003 to flush the addition funnel. The mixture was heated at approximately 70° C. for 1 h. Then 2.95 g (0.0047 mol) of propoxylated pentaerythritol with molecular weight 629 was added, followed by 10 g of Photomer 4003 to flush the addition funnel. The mixture was heated at approximately 70° C. for 1 h, at which point the formation of the component was complete.

The calculated and measured molecular weight of the components is presented in Table 2 below. The measured molecular weight is relative to polystyrene standards.

It should be emphasized that the structures given for the individual components represent ideal structures based upon the stoichiometric relationship of the components used in the synthesis of the material (see, e.g., Santhana et al., *Macromol. Sci. Rev. Macromol. Chem. Phys.*, C33(2):47-180 (1993); McConnell et al., *ACS Symp. Ser.* 417:272-283 (1990); Noren et al., *ACS Symp. Ser.* 417:258-271 (1990); Martin, *Radiation Curing* (August 1986), pp. 4-15; Miller, *Radiation Curing* (May 1984), pp. 4-7, each of which is hereby incorporated by reference in its entirety). Because it is difficult to control the reactivity of the diisocyanate and polyol (or diol) reactants, in most cases both higher and lower molecular weight components (containing a greater or smaller number of polyol or diol component blocks) will be present in any component mixture. In addition, many of the polyol reactants themselves are componentic materials with molecular weight values clustered around an average value. In addition to the measured molecular weights from GPC measurements, calculated molecular weight values based on the idealized structures are also given in the table for the various components and component branches.

TABLE 2

Component Molecular Weight Characterization

| Component Name | $M_n$ (Calc.) | $M_w$ GPC | $M_n$/Branch (Calc.) |
|---|---|---|---|
| 1 | 14600 | $M_n$ = 6600<br>$M_w$ = 9700<br>$M_w/M_n$ = 1.47 | 3600 |
| 2 | 15300 | $M_n$ = 8500<br>$M_w$ = 12300<br>$M_w/M_n$ = 1.45 | 3800 |
| 3 | 9020 | $M_n$ = 17100<br>$M_w$ = 29500<br>$M_w/M_n$ = 1.72 | 9020 |
| 4 | 17600 | $M_n$ = 7740<br>$M_w$ = 13200<br>$M_w/M_n$ = 1.71 | 4400 |
| 5 | 18200 | $M_n$ = 8770<br>$M_w$ = 15800<br>$M_w/M_n$ = 1.80 | 4600 |
| 6 | 37000 | $M_n$ = 11250<br>$M_w$ = 16800<br>$M_w/M_n$ = 1.49 | 9200 |

Example 2—Preparation of Radiation Curable Compositions and Formation of Cured Films Mixtures of non-reactive urethane Components 1, 2, and 4-6 with Photomer 4003 diluent (at ~6:4 wt. ratio) or Component 3, poly(propylene glycol)diacrylate with molecular weight of about 2000 (PPGDA2000), poly(propylene glycol)diacrylate with molecular weight of about 900 (PPGDA900), isobornyl acrylate (IBOA), caprolactone acrylate (SR495), Lucerin TPO photoinitiator (TPO), and Irganox 1035 were blended in the dark with mild heating until uniform.

The prepared composition formulations are summarized in Table 3 below. In each formulation, the curable cross-linker that is essentially free of urethane and urea functional groups, the curable diluent(s), Components 1-6, and photoinitiator components total 100 weight percent. The Components 1, 2, and 4-6 were introduced into the formulations as a mixture with Photomer 4003, which is a consequence of using Photomer 4003 during the reactions in the manner described in Example 1. For example, in Formulation 1, 35 wt. percent of the component in Photomer 4003 diluent was added, which given the 6:4 weight ratio resulted in the introduction of 21 wt. percent Component 1 and 14 wt. percent Photomer 4003. The antioxidant was added in excess (in pph).

TABLE 3

Primary Coating Formulations

| Formulation | Wt. % or pph | Component |
|---|---|---|
| 1 | 21 | Component 1 |
|  | 42 | PPGDA2000 |
|  | 20 | IBOA |
|  | 14 | Photomer 4003 |
|  | 3 | TPO |
|  | 1 pph | I1035 |
| 2 | 21 | Component 2 |
|  | 42 | PPGDA2000 |
|  | 20 | IBOA |
|  | 14 | Photomer 4003 |
|  | 3 | TPO |
|  | 1 pph | I1035 |

TABLE 3-continued

Primary Coating Formulations

| Formulation | Wt. % or pph | Component |
|---|---|---|
| 3 | 21 | Component 1 |
|  | 35 | PPGDA2000 |
|  | 5 | PPGDA900 |
|  | 22 | IBOA |
|  | 14 | Photomer 4003 |
|  | 3 | TPO |
|  | 1 pph | I1035 |
| 4 | 21 | Component 2 |
|  | 35 | PPGDA2000 |
|  | 5 | PPGDA900 |
|  | 22 | IBOA |
|  | 14 | Photomer 4003 |
|  | 3 | TPO |
|  | 1 pph | I1035 |
| 5 | 21 | Component 1 |
|  | 30 | PPGDA2000 |
|  | 5 | PPGDA900 |
|  | 25 | IBOA |
|  | 14 | Photomer 4003 |
|  | 2 | SR495 |
|  | 3 | TPO |
|  | 1 pph | I1035 |
| 6 | 21 | Component 2 |
|  | 30 | PPGDA2000 |
|  | 5 | PPGDA900 |
|  | 25 | IBOA |
|  | 14 | Photomer 4003 |
|  | 2 | SR495 |
|  | 3 | TPO |
|  | 1 pph | I1035 |
| 7 | 21 | Component 1 |
|  | 30 | PPGDA2000 |
|  | 25 | IBOA |
|  | 14 | Photomer 4003 |
|  | 7 | SR495 |
|  | 3 | TPO |
|  | 1 pph | I1035 |
| 8 | 21 | Component 4 |
|  | 30 | PPGDA2000 |
|  | 5 | PPGDA900 |
|  | 25 | IBOA |
|  | 14 | Photomer 4003 |
|  | 2 | SR495 |
|  | 3 | TPO |
|  | 1 pph | I1035 |
| 9 | 21 | Component 5 |
|  | 30 | PPGDA2000 |
|  | 5 | PPGDA900 |
|  | 25 | IBOA |
|  | 14 | Photomer 4003 |
|  | 2 | SR495 |
|  | 3 | TPO |
|  | 1 pph | I1035 |
| 10 | 21 | Component 6 |
|  | 30 | PPGDA2000 |
|  | 5 | PPGDA900 |
|  | 25 | IBOA |
|  | 14 | Photomer 4003 |
|  | 2 | SR495 |
|  | 3 | TPO |
|  | 1 pph | I1035 |
| 11 (Control) | 52 | PGDA8000 |
|  | 45 | Ph4003 |
|  | 3 | TPO |
|  | 1 pph | I1035 |
| 12 | 35 | Component 3 |
|  | 30 | PPGDA2000 |
|  | 5 | PPGDA900 |
|  | 25 | IBOA |
|  | 2 | SR495 |
|  | 3 | TPO |
|  | 1 pph | I1035 |
| 13 | 24 | Component 2 |
|  | 30 | PPGDA2000 |
|  | 22 | IBOA |
|  | 16 | Photomer 4003 |
|  | 5 | SR495 |
|  | 3 | TPO |
|  | 1 pph | I1035 |
| 14 | 21 | Component 1 |
|  | 30 | PPGDA2000 |
|  | 27 | IBOA |
|  | 14 | Photomer 4003 |
|  | 5 | SR495 |
|  | 3 | TPO |
|  | 1 pph | I1035 |
| 15 | 21 | Component 1 |
|  | 30 | PPGDA2000 |
|  | 22 | IBOA |
|  | 14 | Photomer 4003 |
|  | 5 | SR495 |
|  | 3 | TPO |
|  | 1 pph | I1035 |
| 16 | 21 | Component 2 |
|  | 10 | SR492 |
|  | 27 | SR335 |
|  | 25 | IBOA |
|  | 14 | Photomer 4003 |
|  | 3 | TPO |
|  | 1 pph | I1035 |
| 17 | 21 | Component 2 |
|  | 10 | SR501 |
|  | 27 | SR335 |
|  | 25 | IBOA |
|  | 14 | Photomer 4003 |
|  | 3 | TPO |
|  | 1 pph | I1035 |
| 18 | 24 | Component 2 |
|  | 10 | CD564 |
|  | 30 | SR335 |
|  | 33 | Photomer 4003 |
|  | 3 | TPO |
|  | 1 pph | I1035 |

Films were prepared by drawing down the formulations on a glass plate using a 5 mil draw down bar. Films were cured using a Fusion D lamp with a nitrogen purge. The films received a dose of approximately 1350 mJ/cm$^2$. All samples were allowed to condition overnight in a controlled environment at 23° C. and 50% relative humidity.

Tensile properties were measured using a Sintech MTS tensile tester. The gauge length used for testing was 5.1 cm and the test speed was 2.5 cm/minute. Tensile strength, stress at yield point (where yielding was significant), % strain at break, and Young's Modulus values were recorded. These properties of the cured films are presented in Table 4 below.

TABLE 4

Tensile Properties of Cured Films

| Formulation | Young's Modulus (MPa) | Tensile Strength (MPa) | % Elongation |
|---|---|---|---|
| 1 | 1.04 ± 0.01 | 0.67 ± 0.11 | 85 ± 11 |
| 2 | 1.09 ± 0.05 | 0.61 ± 0.09 | 77 ± 11 |
| 3 | 1.08 ± 0.03 | 0.57 ± 0.08 | 72 ± 8 |
| 4 | 1.00 ± 0.07 | 0.54 ± 0.13 | 77 ± 17 |
| 5 | 0.89 ± 0.07 | 0.66 ± 0.05 | 86 ± 3 |
| 6 | 0.76 ± 0.05 | 0.35 ± 0.04 | 104 ± 11 |
| 7 | 0.79 ± 0.06 | 0.43 ± 0.03 | 79 ± 4 |
| 8 | 0.77 ± 0.02 | 0.51 ± 0.07 | 85 ± 7 |

TABLE 4-continued

Tensile Properties of Cured Films

| Formulation | Young's Modulus (MPa) | Tensile Strength (MPa) | % Elongation |
|---|---|---|---|
| 9 | 1.20 ± 0.04 | 0.53 ± 0.10 | 68 ± 13 |
| 10 | 1.34 ± 0.09 | 0.64 ± 0.06 | 64 ± 4 |
| 11 (Control) | 0.37 ± 0.04 | 0.23 ± 0.04 | 136 ± 25 |
| 12 | 1.35 ± 0.06 | 0.64 ± 0.07 | 61 ± 6 |
| 13 | 0.77 ± 0.06 | 0.41 ± 0.04 | 93 ± 13 |
| 14A | 0.81 ± 0.03 | 0.65 ± 0.14 | 118 ± 22 |
| 14B | 0.92 ± 0.05 | 0.83 ± 0.13 | 127 ± 15 |
| 15 | 0.68 ± 0.04 | 0.51 ± 0.15 | 107 ± 24 |
| 16 | 0.75 ± 0.04 | 0.38 ± 0.05 | 47 ± 5 |
| 17 | 0.79 ± 0.05 | 0.37 ± 0.04 | 48 ± 4 |
| 18 | 0.68 ± 0.04 | 0.28 ± 0.02 | 42 ± 2 |

These experiments confirmed that use of acrylate functionality (Control Formula II) separately is unlikely to provide coatings having adequate mechanical properties. The acrylate only formulation had reasonable modulus and elongation properties and it seemed that modifying the coating with some type of reinforcing material to increase tensile strength might be a viable approach. Consequently, it was examined whether a lightly covalently crosslinked acrylate coating could be reinforced using various types of virtual crosslinking mechanisms provided by non-reactive urethane components, preferably non-reactive branched urethane (NRBU) components. The intended interactions are illustrated schematically in FIG. 4. In the NRBU component, a number of urethane group containing branches radiate from a central core. This component does not contain any radiation curable functionality, and this differentiates the coating from the typical primary fiber coating compositions. Without being bound by belief, it is believed that the branches of the NRBU are sufficiently long that they become entangled in the acrylic coating network as it is formed during photopolymerization. These entanglements should behave as physical crosslinks (see FIG. 3) and should increase the tensile properties of the acrylic network. Also, the urethane linkages found along the branches should hydrogen bond to one another, providing additional reinforcement that is similar to that seen with reactive urethane/acrylate oligomers.

The tensile properties of cured films of the various NRBU formulations in Table 3 are given in Table 4. A number of these formulations had suitable properties consistent with their use as primary fiber coatings, i.e., Young's modulus less than about 2 MPa, more preferably about 1 MPa or less, and adequate tensile strength, i.e., about 0.4 MPa or greater. While Formulations 1-10 and 12-15 met these criteria, Formulations 4, 6, 7, and 13-15 in theory exhibited the best combination of these properties.

Figure 5:
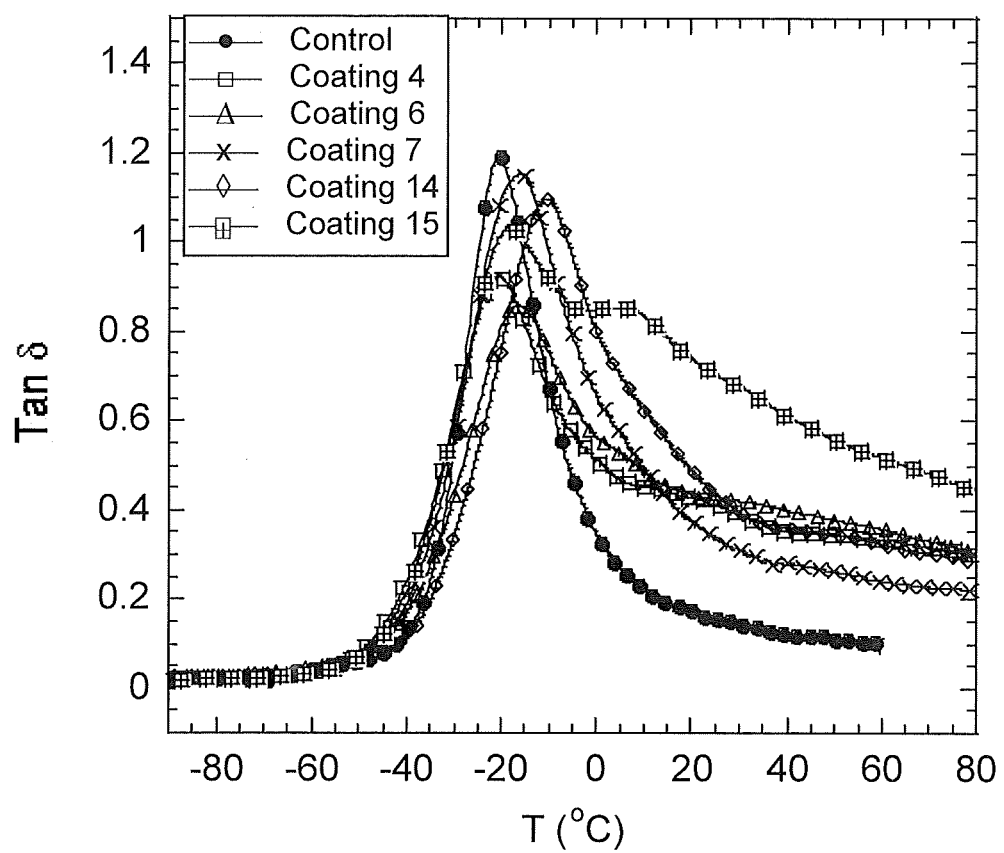
FIG. 5 is a graph of the dynamic mechanical analysis of several primary coatings compared to a control primary coating. In this curve, tan delta (loss modulus/elastic modulus) is plotted against changes in temperature at a frequency of 1 Hz.

An assessment of the mechanical damping properties of the primary coating formulations was conducted. To quantify damping, one typically examines the loss modulus (E") or tan delta (E"/E') versus temperature at a particular deformation frequency (e.g., 1 Hz). FIG. 5 illustrates tan delta versus temperature for a cured, commercial urethane-acrylate coating, Desolite® 951-092 (control, DSM Desotech, Inc, Elgin Ill.), and coatings 4, 6, 7, 14, and 15. The results show that, compared to the control, the inventive coatings have a much broader tan delta function. The peak is broadened because these formulations contain an component that is not chemically attached to the crosslinked polymer network.

Higher values of E" or tan delta indicate that the material is lossy in that molecular modes of relaxation dissipate input mechanical stress effectively. Typically a viscoelastic material has the greatest amount of mechanical dissipation at the peak in tan delta on a frequency or temperature axis. This maximum occurs at the glass transition temperature. To the extent that the curve can be broadened such that the tan delta property remains relatively higher over a larger temperature range, then the coating should be better at dissipating mechanical stress. Without being bound by belief, it is believed that a coating that dissipates mechanical stress efficiently might be more effective in mitigating microbend loss in an optical fiber. Based on the improved tan delta properties for the inventive coatings, it is expected that coated optical fibers possessing the inventive coatings will exhibit improved microbend performance over a range of conditions.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A radiation curable composition comprising:
    a curable cross-linker essentially free of urethane and urea functional groups;
    a curable diluent; and
    a branched non-radiation curable component comprising urethane, thiourethane, and/or urea groups.

2. The radiation curable composition according to claim 1, wherein the curable cross-linker is comprises an $\alpha,\beta$-unsaturated-ester, -amide, -imide or vinyl ether group.

3. The radiation curable composition according to claim 2, wherein the curable cross-linker comprises a polyol acrylate, polyol methacrylate, polyol maleate, polyol fumarate, polyol acrylamide, polyol maleimide or polyol vinyl ether comprising more than one acrylate, methacrylate, maleate, fumarate, acrylamide, maleimide or vinyl ether group.

4. The radiation curable composition according to claim 3, wherein the polyol group is a polyether polyol, a polyester polyol, a polycarbonate polyol, or a hydrocarbon polyol.

5. The radiation curable composition according to claim 1, wherein the curable cross-linker comprises a molecular weight of between 250 and 15000 daltons.

6. The radiation curable composition according to claim 1, wherein the curable cross-linker is present in an amount of about 4 to about 60 percent by weight.

7. The radiation curable composition according to claim 1, wherein the curable diluent comprises at least one acrylate, methacrylate, maleate, fumarate, maleimide, vinyl ether, caprolactam (meth)acrylate, caprolactone (meth)acrylate, or acrylamide group.

8. The radiation curable composition according to claim 1, wherein the curable diluent is present in an amount of about 10 to about 60 percent by weight.

9. The radiation curable composition according to claim 1, wherein the non-radiation curable component is present in an amount of about 10 to about 35 percent by weight.

10. The radiation curable composition according to claim 1 comprising:
    about 4 to about 60 percent by weight of the curable cross-linker;
    about 10 to about 60 percent by weight of the curable diluent; and about 10 to about 35 percent by weight of the non-radiation curable component.

11. The radiation curable composition according to claim 1, wherein the non-radiation curable component comprises a core moiety covalently linked to two or more block moieties that comprise the urethane, thiourethane, and/or urea groups, and terminate in a non-radiation curable capping agent, each of the block moieties comprising one or more soft blocks and optionally one or more hard blocks, wherein the average weight ratio of the soft blocks to hard blocks is at least 3:1.

12. The radiation curable composition according to claim 1, wherein the non-radiation curable component comprises a structure according to formulae (Ia) or (Ib)

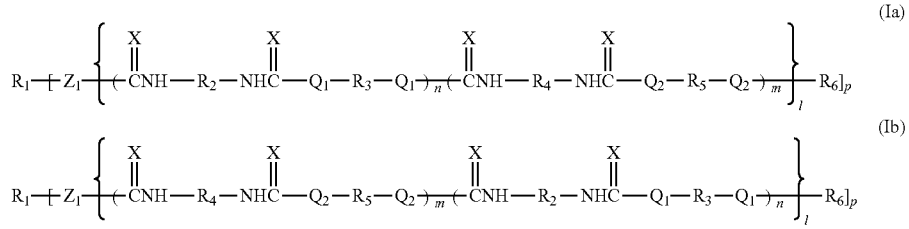

wherein, $R_1$ is a multifunctional core moiety, where the number of functional groups of the core moiety is defined by p, where p is 2 or greater each X is independently S or O;

$Z_1$ is —O—, —S—, —N(H)—, or —N(alkyl)-;

each of $Q_1$ and $Q_2$ is independently —O—, —S—, —N(H)—, or —N(alkyl)-;

each of $R_2$ and $R_4$ is a core moiety of a diisocyanate or dithioisocyanate reactant;

$R_3$ is a core moiety of a polyol or amine-capped polyol reactant;

$R_5$ is a hydrocarbon or oxygen-containing hydrocarbon having an average molecular weight of between about 28 to about 400;

$R_6$ is represented by the structure according to formula (II) or (III)

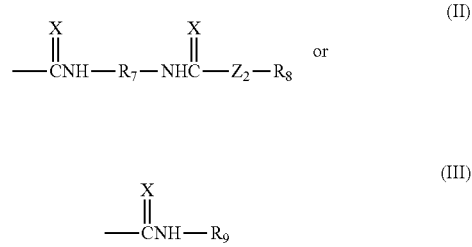

where X is defined as above, $Z_2$ is —O—, —S—, —N(H)—, or —N(alkyl)-, $R_7$ is a core moiety of a di(thio)isocyanate reactant, $R_8$ is a non-radiation curable capping agent, and $R_9$ is a core moiety of an isocyanate or thioisocyanate reactant;

l is 1 to 6;

m is greater than or equal to 0; and n is greater than or equal to 1.

13. The radiation curable composition according to claim 12, wherein $R_1$ is selected from the group consisting of glycerol, where p=3; trimethylol propane, where p=3; pentaerythritol, where p=4; ditrimethylol propane, where p=4; ethylenediamine tetraol, where p=4; xylitol, where p=5; dipentaerythritol, where p=6; sucrose, where p=8; alkoxylated derivatives thereof, and combinations thereof.

14. The radiation curable composition according to claim 12, wherein $R_2$, $R_4$, and $R_7$ are independently selected from the group consisting of:

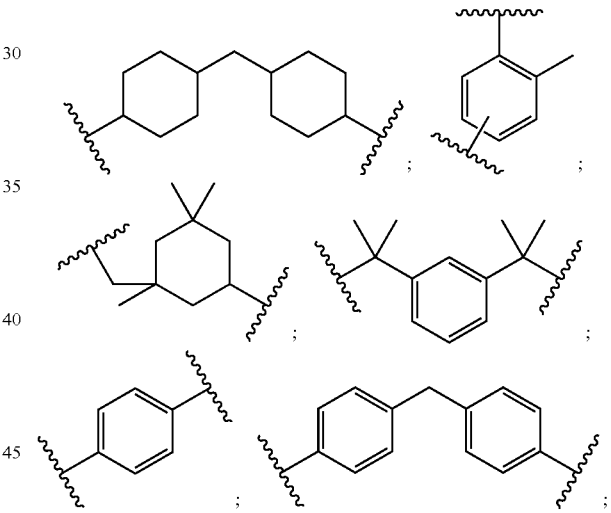

and —$(CH_2)_q$— where q is 2 to 12.

15. The radiation curable composition according to claim 12, wherein $R_3$ has a number average molecular weight of ≥400.

16. The radiation curable composition according to claim 12, wherein $R_3$ is a polyether polyol, polycarbonate polyol, polyester polyol, hydrocarbon polyol, amine-capped derivatives thereof, or any combination thereof.

17. The radiation curable composition according to claim 12, wherein $R_5$ is a saturated hydrocarbon or oxygen-containing hydrocarbon having an average molecular weight of between 28 to 400 daltons.

18. The radiation curable composition according to claim 1, wherein the cured product of the radiation curable composition is characterized by a $T_g$ of less than about 5° C.

19. The radiation curable composition according to claim 1, wherein the cured product of the radiation curable composition is characterized by a Young's modulus of less than 2 MPa.

20. The radiation curable composition according to claim 1, wherein the cured product of the radiation curable composition is characterized by a $T_g$ of less than −20° C.

21. The radiation curable composition according to claim 1, wherein the cured product of the radiation curable composition is characterized by a Young's modulus of less than 1 MPa.

22. The radiation curable composition according to claim 1, wherein the cured product of the radiation curable composition is characterized by a tensile strength of greater than 0.2 MPa.

23. The radiation curable composition according to claim 1, wherein the cured product of the radiation curable composition comprises a tan delta value in the temperature range of about −60° C. to +80° C. that exceeds
  (i) 0.9 over a temperature range that is greater than 12° C.,
  (ii) 0.8 over a temperature range that is greater than 15° C.,
  (iii) 0.7 over a temperature range that is greater than 18° C.,
  (iv) 0.6 over a temperature range that is greater than 22° C., or
  (v) any combination of (i)-(iv).

24. The radiation curable composition according to claim 1, wherein the cured product of the radiation curable composition comprises a tan delta value in the temperature range of about −60° C. to +80° C. that exceeds
  (i) 0.7 over a temperature range that is greater than 25° C.,
  (i) 0.6 over a temperature range that is greater than 30° C.

25. The radiation curable composition according to claim 21, wherein the cured product of the radiation curable composition is characterized by a $T_g$ of less than 5° C.

26. The radiation curable composition according to claim 1, wherein the cured product of the radiation curable composition is characterized by a Young's modulus of less than 2 MPa.

27. The radiation curable composition according to claim 1, wherein the cured product of the radiation curable composition is characterized by a $T_g$ of less than −20° C.

28. A coated optical fiber comprising:
  an optical fiber and
  a primary coating that surrounds the optical fiber, wherein the primary coating is the cured product of the composition according to claim 1.

29. An optical fiber ribbon or bundle comprising:
  a plurality of substantially aligned optical fibers according to claim 22; and
  a matrix encapsulating the plurality of optical fibers.

30. The radiation curable composition according to claim 11, wherein the non-radiation curable component has a molecular weight of between 4000 and 50000 daltons.

31. The radiation curable composition according to claim 11, wherein the core moiety is derived from glycerol, trimethylol propane, pentaerythritol, ditrimethylol propane, ethylenediamine tetraol, xylitol, dipentaerythritol, sucrose, dendrimers, alkoxylated derivatives thereof, and combinations thereof.

* * * * *